United States Patent
Fürst et al.

(10) Patent No.: US 12,256,476 B2
(45) Date of Patent: Mar. 18, 2025

(54) DEVICE FOR THE INDUCTIVE HEATING OF A WORKPIECE IN A ROLLING MILL

(71) Applicant: Primetals Technologies Austria GmbH, Linz (AT)

(72) Inventors: Heinz Fürst, Gallneukirchen (AT); Thomas Lengauer, Weißkirchen a.d. Traun (AT); Bernd Linzer, Leombach (AT); Michael Zahedi, St. Marien (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 827 days.

(21) Appl. No.: 17/422,237

(22) PCT Filed: Jan. 13, 2020

(86) PCT No.: PCT/EP2020/050642
§ 371 (c)(1),
(2) Date: Jul. 12, 2021

(87) PCT Pub. No.: WO2020/148202
PCT Pub. Date: Jul. 23, 2020

(65) Prior Publication Data
US 2022/0086962 A1     Mar. 17, 2022

(30) Foreign Application Priority Data

Jan. 14, 2019 (AT) .............................. A 50022/2019
May 7, 2019 (EP) ..................................... 19172983

(51) Int. Cl.
*H05B 6/10* (2006.01)
*B21B 45/00* (2006.01)
(Continued)

(52) U.S. Cl.
CPC ........... *H05B 6/101* (2013.01); *B21B 45/004* (2013.01); *H01B 7/423* (2013.01); *H05B 6/04* (2013.01); *H05B 6/40* (2013.01)

(58) Field of Classification Search
CPC ..... F27D 2099/0015; F27D 2099/0016; F27D 2099/0018; C21D 9/60; C21D 1/42;
(Continued)

(56) References Cited

U.S. PATENT DOCUMENTS 3,882,297 A * 5/1975 Avalon ..................... H05B 6/04
                                                          338/267
4,761,530 A * 8/1988 Scherer .................... C21D 9/60
                                                          219/673
(Continued)

FOREIGN PATENT DOCUMENTS

CN          1396495 A     2/2003
CN        102361147 A     2/2012
(Continued)

OTHER PUBLICATIONS

International Search Report mailed Mar. 27, 2020 in corresponding PCT International Application No. PCT/EP2020/050642.
(Continued)

*Primary Examiner* — Dana Ross
*Assistant Examiner* — Joseph W Iskra
(74) *Attorney, Agent, or Firm* — OSTROLENK FABER LLP

(57) ABSTRACT

A device (1) for inductive heating of a workpiece (2) in a rolling mill, the device (1) including: a converter (3) for creating an alternating voltage, a capacitor bank (6) electrically connected to the converter (3), and having a plurality of capacitors (7) connected in parallel, a working field (8), in which an upper coil (10) and a lower coil (11) are arranged. The workpiece (2) is able to be passed between the
(Continued)

coils (10, 11) and is thereby inductively heated by cross-field heating. A housing (4) arranged next to, below or above the working field (8). The converter (3) and capacitor bank (6) are arranged in the housing (4). The coils (10, 11) are each electrically connected to the capacitor bank (6) by a flexible cable (12, 13). The cable (12, 13) is a coaxial cable (27), with one phase of the alternating voltage applied to an inner conductor (28) and the other phase of the alternating voltage applied to an outer conductor (29) of the coaxial cable (27). The cables (12, 13) are cooled by a fluid, such as air or water (21).

10 Claims, 4 Drawing Sheets

(51) Int. Cl.
    *H01B 7/42* (2006.01)
    *H05B 6/04* (2006.01)
    *H05B 6/40* (2006.01)

(58) Field of Classification Search
    CPC ... C21D 9/46; H05B 6/04; H05B 6/10; H05B 6/101; H05B 6/103; H05B 6/104; H05B 6/40; H05B 6/06; H05B 6/36; B21B 45/004; H01B 7/423; Y02P 10/25
    USPC ........................................................ 219/602
    See application file for complete search history.

(56) References Cited

U.S. PATENT DOCUMENTS

| | | | |
|---|---|---|---|
| 6,573,485 B2 | 6/2003 | Yokozeki | 219/619 |
| 6,875,966 B1* | 4/2005 | Barber | B23K 1/002 |
| | | | 219/616 |
| 11,839,009 B2* | 12/2023 | Yoshida | H01F 38/14 |
| 2005/0247702 A1* | 11/2005 | Eguchi | H05B 6/06 |
| | | | 219/653 |
| 2007/0062513 A1* | 3/2007 | Gagas | G01G 3/16 |
| | | | 126/299 D |
| 2010/0080259 A1* | 4/2010 | Lovens | H05B 6/36 |
| | | | 373/152 |
| 2012/0248093 A1* | 10/2012 | Ulrich | H05B 6/14 |
| | | | 219/600 |
| 2018/0288833 A1 | 10/2018 | Jones et al. | |

FOREIGN PATENT DOCUMENTS

| | | |
|---|---|---|
| CN | 102415209 A | 4/2012 |
| CN | 209105473 U | 7/2019 |
| DE | 1 246 846 B | 8/1967 |
| DE | 42 34 406 A1 | 4/1994 |
| DE | 37 51 460 T2 | 1/1996 |
| EP | 3 025 799 A1 | 6/2016 |
| JP | H02-207481 A | 8/1990 |
| KR | 10-2011-0040000 A | 4/2011 |
| WO | WO 2004/103595 A1 | 12/2004 |

OTHER PUBLICATIONS

Written Opinion mailed Mar. 27, 2020 in corresponding PCT International Application No. PCT/EP2020/050642.
Chinese Office Action, dated Jul. 19, 2022, issued in corresponding Chinese Patent Application No. 202080009244.X. English translation.

* cited by examiner

DEVICE FOR THE INDUCTIVE HEATING OF A WORKPIECE IN A ROLLING MILL

CROSS-REFERENCE TO RELATED APPLICATIONS

The present application is a 35 U.S.C. §§ 371 national phase conversion of PCT/EP2020/050642, filed Jan. 13, 2020, the contents of which are incorporated herein by reference herein, which claims priority of Austrian Patent Application No. A50022/2019 filed Jan. 14, 2019, the contents of which are incorporated herein by reference and claims priority of European Patent Application No. 19172983.9, filed May 7, 2019, the contents of which are incorporated by reference herein. The PCT International Application was published in the German language.

FIELD OF THE INVENTION

The invention relates to a device for the inductive heating of a workpiece in a rolling mill.

BACKGROUND OF THE INVENTION

DE 42 34 406 A1 discloses a device for the inductive transverse-field heating of flat material, wherein a number of mutually opposite induction loops are arranged above and below the flat material and some induction loops extend beyond the edges of the flat material, while other induction loops end within the width of the flat material. At least one pair of induction modules consists of two induction modules that are adjustable independently of one another in their position with respect to the flat material. Each induction module has two mutually opposite U-shaped induction loops having invariable geometries and dimensions. The base legs of each module can be positioned in such a way that they end at least a predeterminable distance before one edge of the flat material and within the width of the flat material. The two side legs of each module can be positioned in such a way that they project at least a predeterminable distance beyond the other edge of the flat material. The induction loops of both induction modules of a pair of induction modules are open toward oppositely directed sides, whereby only the side legs of one induction loop project beyond each edge of the flat material.

The invention is based on the object of providing an improved device for the inductive heating of a workpiece in a rolling mill.

BRIEF DESCRIPTION OF THE INVENTION

According to the invention, the device for the inductive heating of a workpiece in a rolling mill comprises:
  a converter for producing an alternating voltage,
  a capacitor bank electrically connected to the converter and comprising a plurality of capacitors connected in parallel,
  a working zone, in which an upper coil and a lower coil are arranged, wherein the workpiece can be moved through between the coils and the workpiece is thereby inductively heated by transverse-field heating,
  a housing arranged next to, below or above the working zone, wherein the converter and the capacitor bank are arranged in the housing,
wherein the coils are electrically connected to the capacitor bank by a respective flexible cable,
  wherein the cables are formed as coaxial cables, wherein one phase of the alternating voltage is on an inner conductor and the other phase of the alternating voltage is on an outer conductor of the coaxial cable, and
  wherein the cables are cooled by a fluid, such as air or water.

The rolling mill is for example a combined casting and rolling mill, preferably of the Arvedi ESP type, with a continuous casting machine and at least one hot rolling train, and preferably two trains, specifically a roughing rolling train and a finishing rolling train. The workpiece is typically a flat material, for example a thin or medium slab of steel or a so-called roughed strip, which has been rolled from the thin or medium slab by roughing. The thickness of the roughed strip is typically between 4 and 55 mm, preferably between 6 and 45 mm, particularly preferably between 8 and 20 mm. The width of the workpiece is between 6 and 2400 mm.

In known solutions for inductive heating by means of a longitudinal field, a transverse movement of the coils is not possible and not required due to the action and type of construction of this technology. Since the coils are fixedly mounted in the mill, the supplying of voltage from the capacitor bank to the coils takes place by means of conductor rails.

In the case of inductive heating by means of transverse-field technology, it is advantageous for process related reasons to displace the coils transversely to the strip running direction. This applies in particular in the case of different widths of the flat material. This procedure is described for example in WO 2004/103595 A1. Therefore, the capacitors are usually mounted on the coil cars, for one reason to keep the connecting length between the capacitors and the coils as short as possible, since in this region the highest currents flow, and consequently the greatest losses in the conductor occur and therefore also the greatest thermal loading of the conductor occurs. For this reason and because of the required transverse movement of the coils, it is usual to mount the capacitors on the coil car, in order that the supplying of voltage between the capacitors and the coils can take place by conductor rails with large cross sections and short paths.

As compared with known solutions, in which the capacitors are arranged in the vicinity of the coils outside the housing, according to the invention, the capacitor bank is protected from hot air, dust, radiant heat, vapor and water by being arranged in a housing. The housing is arranged next to, above or below the working zone. For example, the housing may be formed as an electrical compartment which is located below or above the rolling mill in a space-saving way. The converters and the capacitor bank are easily accessible for maintenance purposes within the housing.

During the operation of the rolling mill, the workpiece, for example a flat strip with a thickness of 18 mm and a width of 1800 mm, is transported in the longitudinal direction through the working zone and is thereby inductively heated by the coils by means of transverse-field heating. In order to bring the workpiece to rolling temperature, a number of coils (for example 4 to 16) may be arranged one behind the other in the direction of material flow.

In one embodiment, the converter and the capacitor bank are electrically connected to one another within the housing by at least two conductor rails.

Use of the conductor rails for connecting the capacitor bank to the converter is possible since no relative movement between the capacitor bank and the converter is required. In this way, it is possible to dispense with long cable connections at this point, whereby electrical losses are reduced.

In one embodiment, the coils are arranged together in a coil car. As a result, in the event of a fault of the rolling mill, the coils can be quickly removed from the workpiece or moved out.

In one embodiment, an air-conditioning unit or an air-conditioning system controls the air conditions in the interior of the housing. In this way, the converter and the capacitor bank are accommodated in a clean, dry and air-conditioned environment and are actively protected from heat from the rolling mill.

The cables are formed as coaxial cables, wherein one phase of the alternating voltage is on an inner conductor and the other phase of the alternating voltage is on an outer conductor of the coaxial cable.

The coaxial cable reduces a magnetic stray field, so that the electromagnetic compatibility with nearby devices is improved.

The cables are cooled by a fluid, such as air or water. This is not passive but active cooling which has the effect of increasing or improving the heat transfer between the cable and the fluid. By contrast, a "passively cooled" cable also gives off heat to the ambient air, for example by free or natural convection. In the case of active cooling, the heat transfer from the cable to the fluid is greatly increased by a forced cooling, for example by a fan for blowing air onto the cable or by a cooling fluid flowing through the coaxial cable, preferably a liquid coolant or cooling water. In this way, the electrical resistance of the cable and the development of heat can be reduced and the current flow can be increased with the same conducting cross section. According to an advantageous embodiment, the cable gives off heat to the fluid, for example cooling water, and the cooling water gives off the heat to the surroundings or to another medium, for example by way of a heat exchanger.

If cooling water is used, it is favorable to use a deionized water, demineralized or at least distilled water, since these cooling media have a much lower conductivity or a higher electrical insulating effect. After the heat has been given off, the cooling water can take up heat once again in the cooling circuit.

In one embodiment, the coil car comprises at least one height-adjusting element (for example a hydraulic, pneumatic or electromechanical height-adjusting element), preferably two or four height-adjusting elements, for the height adjustment of the coils with respect to the workpiece. In this way, a distance between the coils and the workpiece can be set or, in the case of different workpiece thicknesses, the distance can be kept constant. As a result, the efficiency of the induction heating is increased.

Preferably, the distance between the upper coil and the upper side and between the lower coil and the lower side of the workpiece is set to the same value.

In one embodiment, at least one transverse-adjusting element, for example a hydraulic, pneumatic or electromechanical actuator is provided, for moving the coil car in a transverse direction of the workpiece, for example away from the housing or toward it.

In one embodiment, the transverse-adjusting element is arranged on a side of the coil car that is facing away from the cables. In this way, the available space, the accessibility and the ease of maintenance can be improved.

In one embodiment, the cables are connected to the coils on a side of the coil car that is facing the housing. In this way, the length of the cables can be minimized and electrical losses reduced.

Since converters are more sensitive than capacitors, it is advantageous to arrange the converter in a converter cabinet that is located within the housing.

In the event of a fault of the converter or of the capacitor bank, an accidental arc may occur. In order to be able to discharge the excess pressure occurring inside the housing to the outside, it is advantageous if the housing is connected to a shaft, so that the excess pressure can be discharged to the outside by way of the shaft, preferably outside the building. As a result, toxic vapors that are possibly released as a result of the accidental arc are kept away from the rolling mill and the operating crew.

Preferably, the shaft is closed during normal operation by an explosion flap. The explosion flap only opens in the event of an accidental arc. As a result, the housing can be air-conditioned in spite of the shaft.

A number of converters and respectively connected capacitor banks may be arranged in the same housing. Similarly, a number of sets of coils may be provided in respective coil cars, which are each connected to one of these capacitor banks. These sets of coils may be arranged one after the other in the strip running direction, so that the workpiece passes them one after the other. One or more roller table rollers may be respectively provided between successive sets of coils.

The properties, features and advantages of this invention described above and also the manner in which they are achieved become clearer and more clearly understandable in connection with the following description of the exemplary embodiments, which are explained more specifically in conjunction with the drawings, in which:

DESCRIPTION OF EMBODIMENTS

Figure 1:
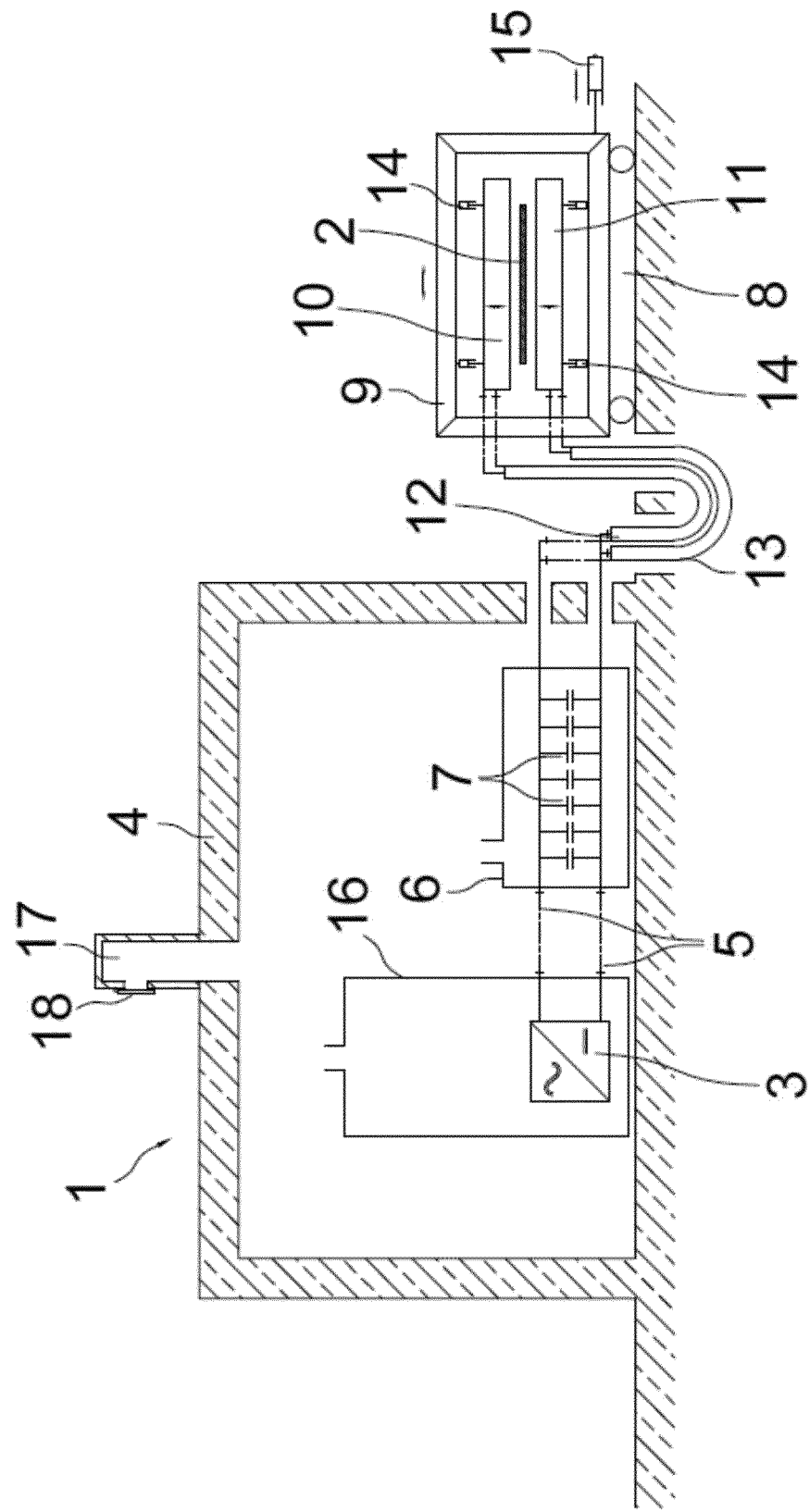
FIG. 1 shows a schematic view of a first device for the inductive heating of a workpiece.

FIG. 1 shows a schematic view of a device 1 for the inductive heating of a metallic workpiece 2, in particular a flat material, in a rolling mill. The device 1 has a converter 3 for producing an alternating voltage, in particular a two-phase alternating voltage, with a specific frequency and a specific amplitude. The converter 3 is accommodated in a fixedly arranged housing 4 next to the rolling mill. The alternating voltage is fed by way of two conductor rails 5 from the converter 3 to a capacitor bank 6 comprising a plurality of capacitors 7 connected in parallel. The capacitor bank 6 is likewise arranged within the housing 4. The interior of the housing 4 may be air-conditioned, in particular cooled. Furthermore, the housing is for example secured by a door or some other access system, so that unauthorized persons do not gain access to the electrical devices in the interior of the housing 4.

In this way, the converter 3 and the capacitor bank 6 are accommodated in a clean, dry and air-conditioned environment and are actively protected from heat from the rolling mill.

Use of the conductor rails 5 for connecting the capacitor bank 6 to the converter 3 is possible since no relative movement between the capacitor bank 6 and the converter 3 is required. In this way it is possible to dispense with long cable connections at this point, whereby electrical losses are reduced.

The housing 4, as it is shown, is arranged next to a working zone 8 or a coil car 9 of the rolling mill for rolling flat material. It is possible for the housing 4 to be located below (see FIG. 2) or above (see FIG. 3) the working zone 8 or the coil car 9. In addition to a horizontal offset, the housing may also have a vertical offset in relation to the working zone 8 or the coil car 9. Arranged in the working zone 8 is a coil car 9. Arranged in the coil car 9 are an upper coil 10 and a lower coil 11, between which the workpiece 2 can be moved through. The direction of movement of the workpiece 2 in FIG. 1 is perpendicular to the plane of the image that is toward the viewer or away from the viewer. The coils 10, 11 are electrically connected to the capacitor bank 6 by a respective flexible cable 12, 13. In the embodiment shown, the conductor rails 5 are led out of the housing 4 beyond the capacitor bank 6 and the cables 12, 13 are connected to the conductor rails 5 outside the housing 4.

The flexible cables 12, 13 allow relative movement of the connected coils 10, 11 with respect to the housing 4.

In an alternative embodiment that is not shown, the cables 12, 13 may be led into the housing 4 and connected there to the capacitor bank 6.

In an alternative embodiment that is not shown, a common cable is provided for connecting the two coils 10, 11 to the capacitor bank.

The cables 12, 13 may be formed as coaxial cables (see FIG. 4), wherein one phase of the alternating voltage is on an inner conductor and the other phase of the alternating voltage is on an outer conductor. Furthermore, the cables 12, 13 may be water-cooled. In this way, the electrical resistance of the cable 12, 13 and the development of heat can be reduced and the current flow can be increased. The coaxial cable reduces a magnetic stray field, so that the electromagnetic compatibility with nearby devices is improved.

The coils 10, 11 are adjustable in height within the coil car 9, for example by hydraulic, pneumatic or electromechanical height-adjusting elements 14. In this way, a distance between the coils 10, 11 and the workpiece 2 can be set. The coil car 9 can be moved as a whole in a transverse direction, transversely to the direction of movement of the workpiece 2, that is away from the housing 4 or toward it, for example by at least one hydraulic, pneumatic or electromechanical transverse-adjusting element 15. This is arranged for example on the side of the coil car 9 that is facing away from the housing 4. The coil car 9 is moved by its wheels. In this way, the available space, accessibility and ease of maintenance can be improved.

In one embodiment, the cables 12, 13 are connected to the coils 10, 11 on the side of the coil car 9 that is facing the housing 4. In this way, the length of the cables 12, 13 can be minimized and electrical losses correspondingly reduced.

Similarly, further media connections, for example for compressed air, water and/or hydraulics, can be provided on the side of the coil car 9.

Figure 2:
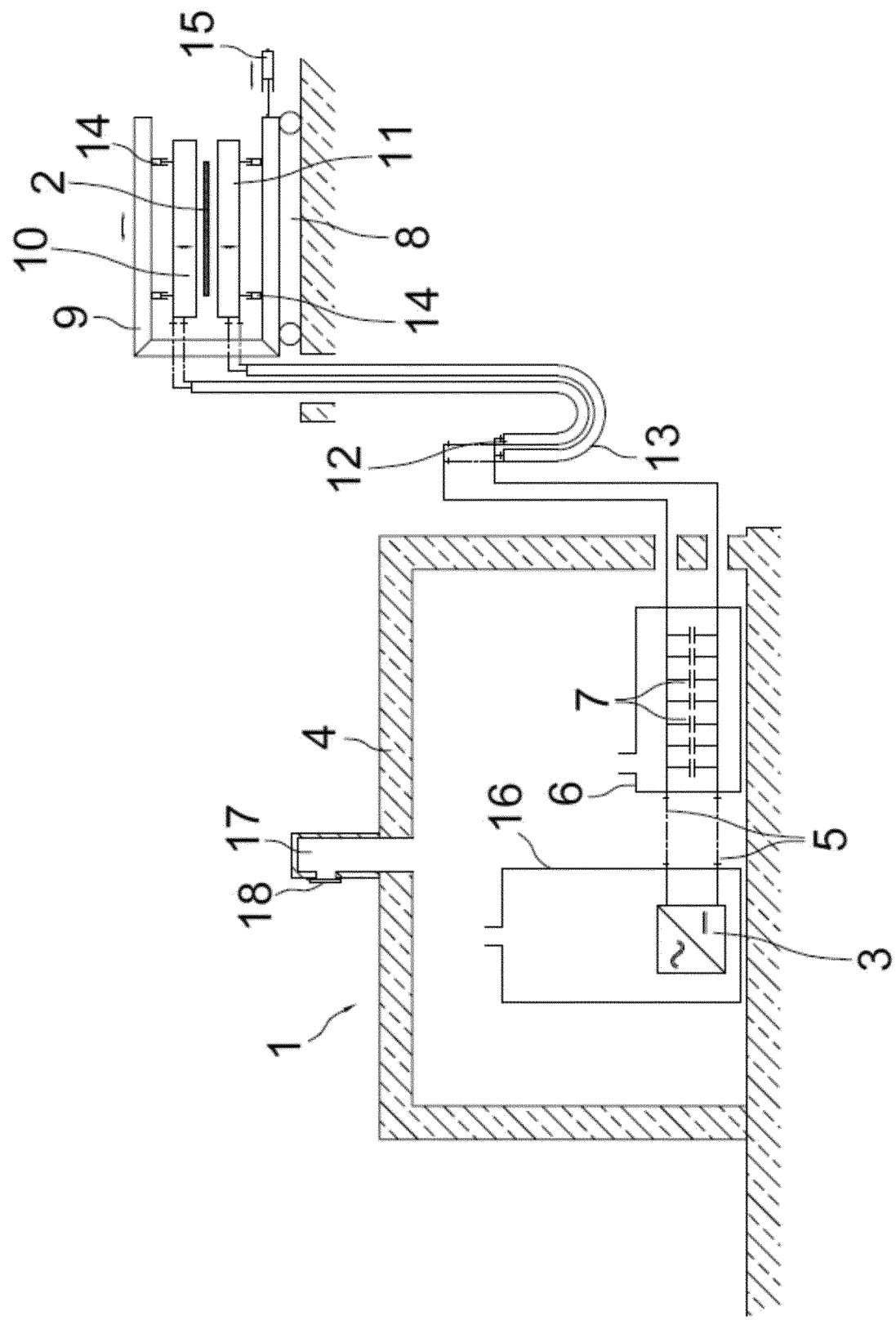
FIG. 2 shows a schematic view of a second device for the inductive heating of a workpiece.
Figure 3:
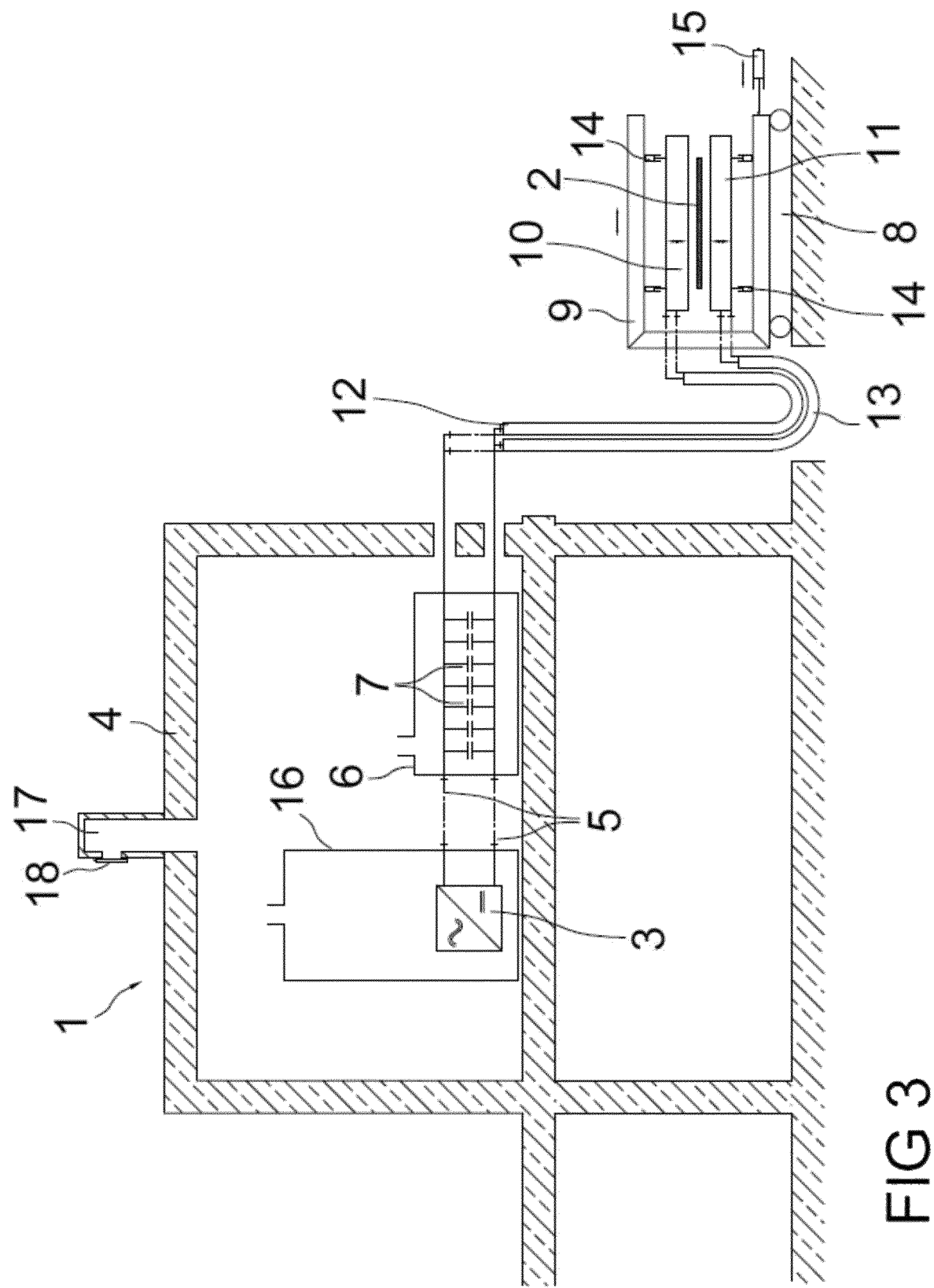
FIG. 3 shows a schematic view of a third device for the inductive heating of a workpiece.

In an embodiment shown in FIGS. 2 and 3, the coil car 9 is designed as open on one side, so that it can be moved out completely from the mill, even while the strip is running through. Similarly, the coil car 9 can be moved out of the mill during breaks in production, in order to easily exchange the coils 10, 11 there. Quick-action couplings may be provided for the cables 12, 13, in order to disconnect them from the coils 10, 11 in an easy way.

The device 1 may be arranged in the rolling mill, for example a combined casting and rolling mill of the Arvedi ESP type, for example between two rolling stages, i.e. between the roughing rolling train and the finishing rolling train.

If an accidental arc occurs in the converter 3 or in the capacitor bank 6, the excess pressure in the interior of the housing 4 is discharged to the outside through a shaft 17. As a result, vapors, which are sometimes toxic, are kept away from the rolling mill and the operating crew. The shaft 17 is closed by an explosion flap 18, so that the housing 4 can be air-conditioned without any problem.

FIGS. 2 and 3 respectively show a schematic view of a second and third device 1 for the inductive heating of a metallic workpiece 2, wherein the housings 4 are arranged in FIG. 2 below and in FIG. 3 above the working zone 8. The coil cars 9 in FIGS. 2 and 3 are open on one side, so that the coil car 9 can be moved out to the side, in order, for example, to rectify a fault in the rolling mill.

Figure 4:
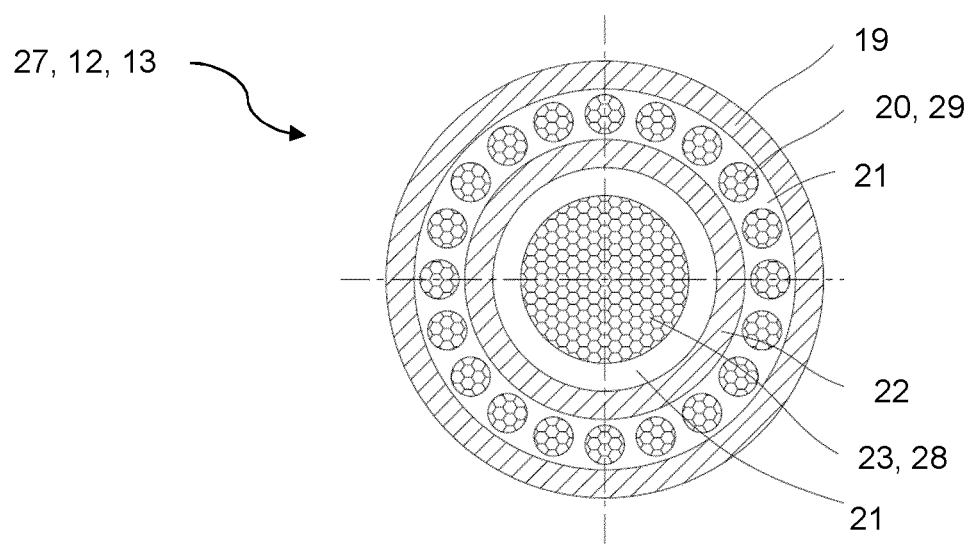
FIG. 4 shows a schematic view of a cross section through a water-cooled coaxial cable.

FIG. 4 schematically shows a cross section through a cable 12, 13, specifically a water-cooled coaxial cable 27. The inner and the outer conductor 28, 29 of the cable comprises inner and outer wires 23, 20, typically of copper or a copper alloy. The cable 12, 13 is insulated with respect to the surroundings by an outer cable sheath 19. In order to be able to remove heat from the inner and outer conductors 28, 29, the spaces between the outer cable sheath 19 and the intermediate sheath 22 and between the intermediate sheath 22 and the inner conductor 28 are flowed through by a cooling fluid, here cooling water 21.

Figure 5:
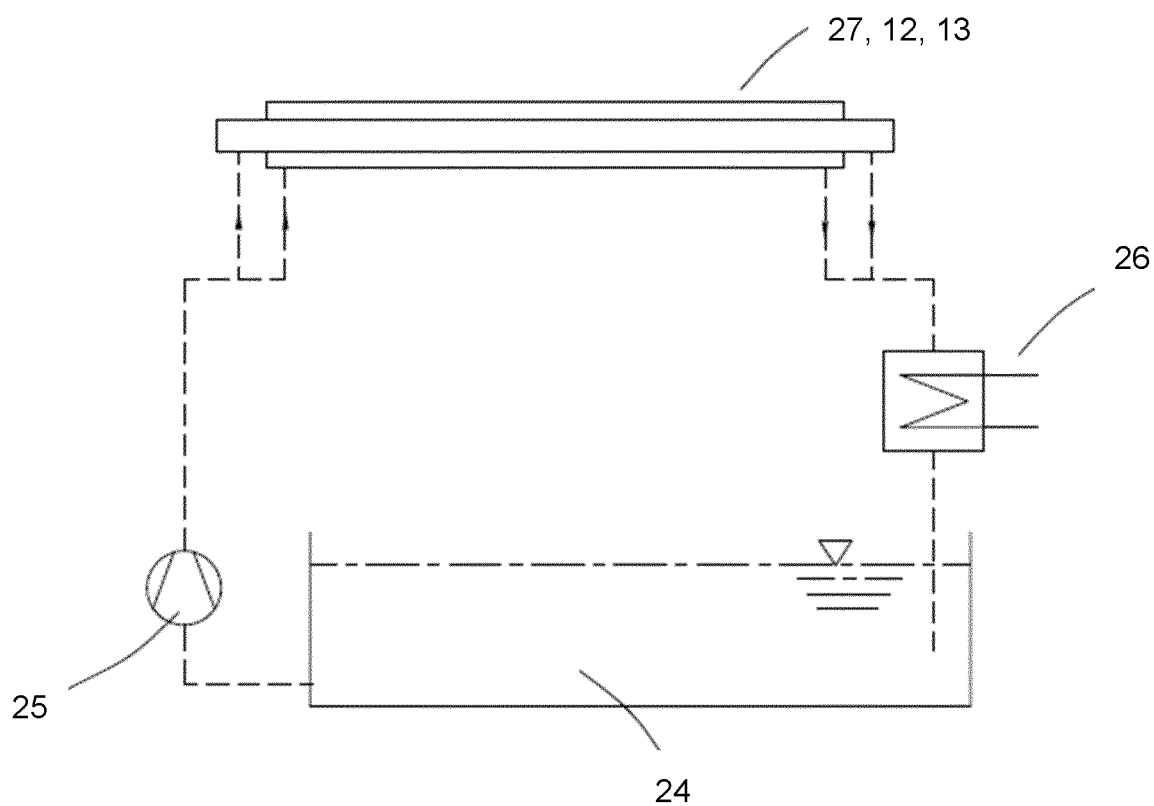
FIG. 5 shows a diagram of the active water cooling of a coaxial cable.

FIG. 5 shows a diagram of a cooling circuit for the active water cooling of a flexible coaxial cable 27, 12, 13 from FIG. 4. The cooling water is fed to the coaxial cable 27, 12, 13 from a water tank 24 by a water pump 25 and cools the cable. After flowing through the cable, the cooling water is cooled by a heat exchanger, for example a water-air heat exchanger, or a water-water heat exchanger, and fed back to the water tank.

The cooling water is typically a liquid, water-based coolant with additives, in order to improve the electrical insulating effect and the aging resistance of the cooling water.

Although the invention has been illustrated more specifically and described in detail by the preferred exemplary embodiment, the invention is not restricted by the examples disclosed and other variations may be derived therefrom by a person skilled in the art without departing from the scope of protection of the invention.

LIST OF DESIGNATIONS

1 Device
2 Workpiece
3 Converter
4 Housing
5 Conductor rail
6 Capacitor bank
7 Capacitor
8 Working zone
9 Coil car
10 Upper coil
11 Lower coil
12 Cable
13 Cable
14 Height-adjusting element
15 Transverse-adjusting element 16 Converter cabinet
17 Shaft
18 Explosion flap
19 Outer cable sheath
20 Outer wires
21 Cooling water
22 Intermediate sheath
23 Inner wires
24 Water tank
25 Water pump
26 Heat exchanger
27 Coaxial cable
28 Inner conductor
29 Outer conductor

The invention claimed is:

1. A device for inductive heating of a workpiece in a rolling mill, wherein the device comprises:
a converter for producing a two-phase alternating voltage,
a capacitor bank electrically connected to the converter and the capacitor bank comprising a plurality of capacitors connected in parallel,
a working zone that includes a coil car, in which an upper coil and a lower coil are arranged, wherein the workpiece can be moved through between the coils such that the workpiece is thereby inductively heated by transverse-field heating,
a housing fixed next to the rolling mill, and arranged next to, below or above the working zone, wherein the converter and the capacitor bank are arranged in the housing, and the coil car is movable away or toward the housing,
a first flexible cable and a second flexible cable;
the upper coil is electrically connected to the capacitor bank by the first flexible cable,
the lower coil is electrically connected to the capacitor bank by the second flexible cable,
the flexible cables are configured as coaxial cables, wherein one phase of the alternating voltage is on an inner conductor and another phase of the alternating voltage is on an outer conductor of each of the coaxial cables,
the cables are configured to be cooled by a fluid; and
a first conductor rail and a second conductor rail residing at least partially in the housing, wherein the converter is electrically connected to the first and the second rails inside the housing, the plurality of capacitors are electrically connected to the first and the second conductor rails inside the housing and are connected in parallel via the first and the second conductor rails inside the housing, wherein the first flexible cable electrically connects the first and the second conductor rails to the upper coil, and the second flexible cable electrically connects the first and the second conductor rails to the lower coil.

2. The device as claimed in claim 1, wherein an interior of the housing is air conditioned.

3. The device as claimed in claim 1, wherein the coil car comprises at least one height-adjusting element configured for the height adjusting the coils with respect to the workpiece.

4. The device as claimed in claim 1, wherein the coil car comprises at least one transverse-adjusting element configured for moving the coil car in a transverse direction of the workpiece.

5. The device as claimed in claim 4, wherein the transverse-adjusting element is arranged on a side of the coil car that is facing away from the cables.

6. The device as claimed in claim 1, wherein the cables are connected to the coils on a side of the coil car that is facing the housing.

7. The device as claimed in claim 1, further comprising a converter cabinet in which the converter is arranged, and the converter cabinet is located within the housing.

8. The device as claimed in claim 1, further comprising a shaft to which the housing is connected, so that in the event of an accidental arc, an excess pressure in the interior of the housing can be discharged to the outside by way of the shaft.

9. The device as claimed in claim 8, further comprising an explosion flap, the shaft is operable to be closed during normal operation.

10. The device of claim 1, wherein the fluid for cooling the cables comprises air or water.

* * * * *